July 5, 1927.

H. B. WALKER

TRUCK

Filed April 21, 1926

1,635,018

INVENTOR
Henry B. Walker
BY Archworth Martin.
ATTORNEY

Patented July 5, 1927.

1,635,018

UNITED STATES PATENT OFFICE.

HENRY B. WALKER, OF MARION, OHIO, ASSIGNOR TO THE FAIRFIELD ENGINEERING COMPANY, OF MARION, OHIO, A CORPORATION OF OHIO.

TRUCK.

Application filed April 21, 1926. Serial No. 103,465.

My invention relates to trucks or wheeled vehicles, and particularly to those having a swiveled axle for each one of a pair of wheels, whereby the wheels may be adjustably positioned to permit movement of the vehicle in more than one direction relative to the longitudinal center line of the vehicle.

One field of use for my invention is in connection with what are known as portable conveyers, wherein the wheels are disposed in what may be termed their normal positions when moving the conveyer from one location to another, and wherein the axles of the wheels may be turned at right angles to the first named position, to permit swinging the discharge end of the conveyer in the arc of a circle about its reclining end as a center, and so as to permit sidewise movement of the vehicle, as when it is desired to move either the discharge end or the material receiving end of the conveyer laterally while in use.

One object of my invention is to provide a structure of the character referred to, that is simpler and less expensive than those heretofore employed, and which nevertheless can be conveniently and easily manipulated.

Figure 1:
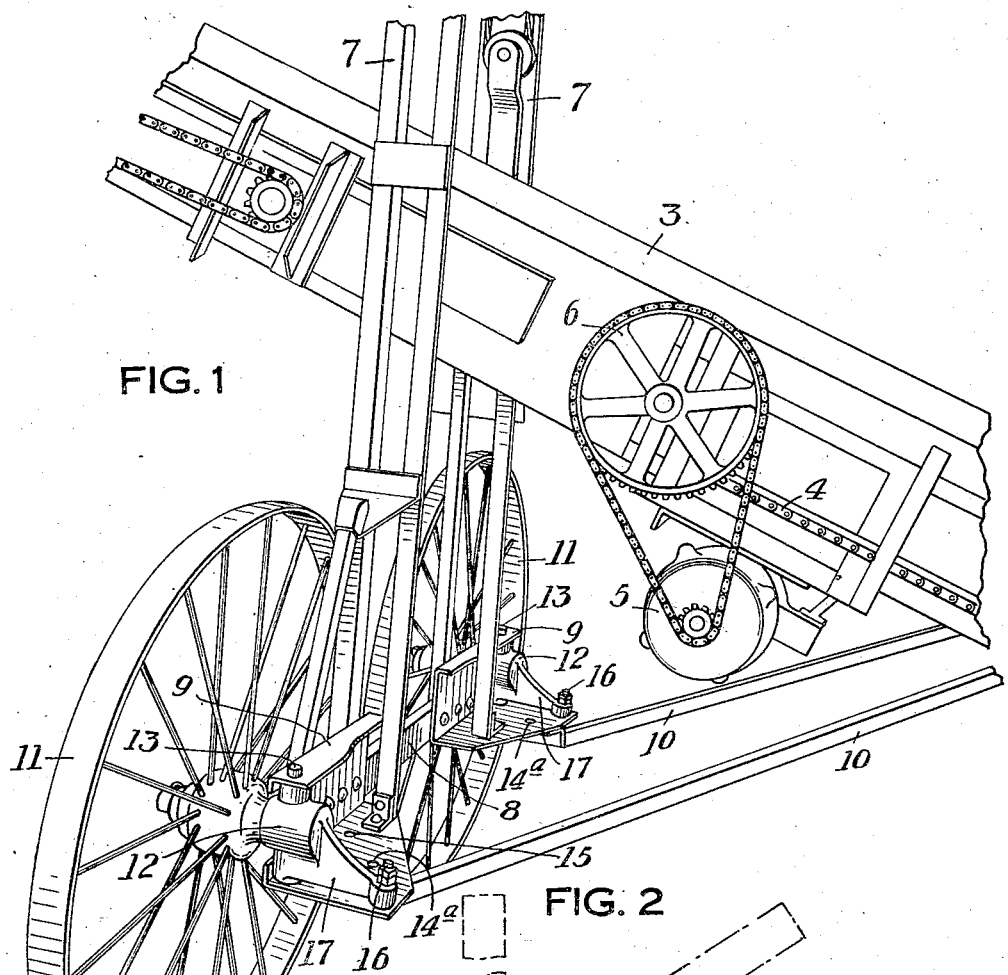
Figure 2:
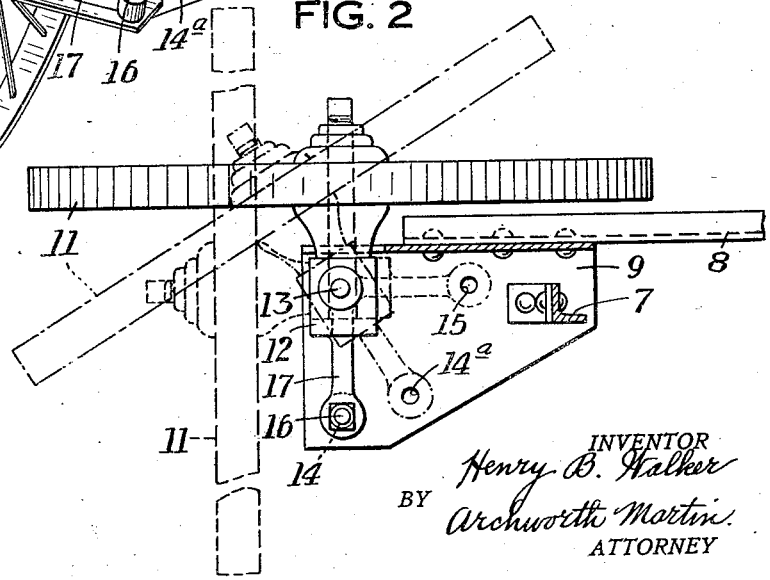

One form which my invention may take is shown in the accompanying drawing, wherein Fig. 1 is a perspective view of a portion of a conveyer structure embodying my invention, and Fig. 2 is a sectional plan view of a portion of the device of Fig. 1.

Since the conveyer per se does not constitute a part of my invention, I have not shown it in detail. The conveyer trough is represented at 3. The conveyer chain 4 is driven by motor 5 through a sprocket wheel 6, in any well known manner. Likewise, the conveyer trough 3 is supported by, and vertically adjustable with respect to, uprights 7, as is common practice.

The truck frame for the conveyer comprises a bolster 8, channel irons 9 and tiebars or braces 10. The channel irons 9 are riveted or otherwise secured to the bolster 8, as shown more clearly in Fig. 2, and the uprights 7 and bars 10 are suitably attached to the channel irons and the bolster.

Each of the wheels 11 is mounted upon a short axle that is secured to a spindle 12. The spindle 12 is disposed between, and pivotally connected to, the flanges of channel 9, by a pin or pins 13, so that it may be moved about a vertical axis. The bottom flange of the channel iron 9 is provided with holes at 14, 14$^a$ and 15 for the reception of a bolt 16. The spindle 12 has an extension or arm 17 that is provided with a hole for the passage of the bolt 16. Thus, when the conveyer is in use, the bolts 16 will ordinarily extend through the channels 9, at 14, and through the extensions 17 of the spindles, to maintain the wheels in the positions shown in Fig. 1 and permit sidewise movement of the conveyer. When the bolts 16 and the spindles are shifted to the holes at 15, the wheels will occupy the position indicated by dash lines in Fig. 2 and permit convenient movement of the conveyer from one location to another, as along a highway; while if shifted to holes 14$^a$, as indicated in dot and dash lines, the conveyer will swing in a circle about the base or receiving end as a center.

From the form it will be seen that I provide a structure that is of simple form and wherein the adjustments of the wheels can be easily made in a brief period of time.

It will be understood that the receiving or lower end of the conveyer, which is broken away in the drawing, may be provided with wheels mounted on spindles as are the wheels 11.

I claim as my invention:

The combination with a truck bolster, of a channel iron having its web vertically disposed, and one flange of materially greater width than the other flange, a spindle disposed between the flanges and pivotally connected thereto, an axle connected to the spindle, a radially extending projection on the spindle, and means for detachably connecting said projection to said wider flange at a plurality of arcuately spaced points.

In testimony whereof I the said HENRY B. WALKER have hereunto set my hand.

HENRY B. WALKER.